US008752680B2

(12) United States Patent
Boonpongmanee et al.

(10) Patent No.: US 8,752,680 B2
(45) Date of Patent: Jun. 17, 2014

(54) MULTI-CHAMBERED, LIQUID-COOLED DISC BRAKE

(75) Inventors: Thaveesak Boonpongmanee, Westlake, OH (US); Daniel Wepplo, Rocky River, OH (US); Donald Danko, Medina, OH (US)

(73) Assignee: Eaton Corporation, Cleveland, OH (US)

( * ) Notice: Subject to any disclaimer, the term of this patent is extended or adjusted under 35 U.S.C. 154(b) by 108 days.

(21) Appl. No.: 13/549,944

(22) Filed: Jul. 16, 2012

(65) Prior Publication Data
US 2014/0014446 A1 Jan. 16, 2014

(51) Int. Cl.
*F16D 65/853* (2006.01)

(52) U.S. Cl.
CPC .................................. *F16D 65/853* (2013.01)
USPC ................ 188/264 D; 192/70.12; 192/113.36

(58) Field of Classification Search
CPC ............................... F16D 57/00; F16D 65/853
USPC .... 188/71.5, 218 XL, 264 B, 264 CC, 264 D, 188/264 F, 264 R; 192/70.12, 85.61, 113.1, 192/113.3, 113.34, 113.35, 113.36
See application file for complete search history.

(56) References Cited

U.S. PATENT DOCUMENTS

| 2,127,557 A | * | 8/1938 | Eils | 188/264 D |
| 2,556,809 A | * | 6/1951 | Hobbs | 192/85.05 |
| 2,675,106 A | * | 4/1954 | Foster | 192/113.23 |
| 2,821,272 A | | 1/1958 | Eames et al. | |
| 2,934,178 A | | 2/1960 | Eaton | |
| 2,986,238 A | * | 5/1961 | Eaton | 188/251 M |
| 3,022,867 A | * | 2/1962 | Maloney et al. | 188/264 D |
| 3,028,935 A | * | 4/1962 | Gold et al. | 188/264 D |
| 3,047,103 A | | 7/1962 | Schwartz | |
| 3,530,965 A | * | 9/1970 | Wilson | 192/113.31 |
| 3,572,477 A | * | 3/1971 | Ewart | 188/264 D |
| 3,633,714 A | * | 1/1972 | Klaue | 188/134 |
| 3,648,814 A | * | 3/1972 | Barron | 192/113.31 |
| 4,238,017 A | * | 12/1980 | Spokas | 192/82 T |
| 5,358,077 A | | 10/1994 | DeConti | |
| 5,629,101 A | | 5/1997 | Watremez | |
| 5,980,602 A | | 11/1999 | Carden | |
| 6,044,894 A | | 4/2000 | Fujita et al. | |

(Continued)

FOREIGN PATENT DOCUMENTS

GB     860419     2/1961

OTHER PUBLICATIONS

Thesis Entitled "Computations of Flow Structures and Heat Transfer in a Dimpled Channel at Low to Moderate Reynolds Number", Wilfred Vinod Patrick, Apr. 25, 2005, Submitted to Faculty of Virginia Polytechnic Institute and State University.

(Continued)

*Primary Examiner* — Christopher Schwartz
(74) *Attorney, Agent, or Firm* — Squire Sanders (US) LLP

(57) ABSTRACT

A braking system includes at least one rotating disc, and at least one brake disc having a front face and a rear face. The brake disc has at least four inner chambers disposed therein. Each of the at least four inner chambers has a liquid inlet and a liquid outlet and defines a liquid pathway. At least one biasing element is configured to move the front face of the at least one brake disc into contact with the at least one rotating disc.

20 Claims, 5 Drawing Sheets

(56) References Cited

U.S. PATENT DOCUMENTS

| | | |
|---|---|---|
| 6,427,754 B1 | 8/2002 | Ozcan |
| 7,374,027 B2 | 5/2008 | Mayberry et al. |
| 7,556,128 B2 | 7/2009 | Mayberry et al. |
| 7,591,349 B2 | 9/2009 | McGonkie et al. |
| 2008/0110708 A1 | 5/2008 | Mayberry et al. |
| 2008/0185239 A1 | 8/2008 | Hakon et al. |
| 2009/0032344 A1 | 2/2009 | Thompson |
| 2009/0065320 A1 | 3/2009 | Culmer |
| 2009/0133974 A1 | 5/2009 | Mayberry et al. |
| 2010/0270117 A1* | 10/2010 | Boonpongmanee ......... 192/58.2 |
| 2011/0135948 A1 | 6/2011 | Pyzik et al. |
| 2013/0341136 A1* | 12/2013 | Boonpongmanee et al. ......... 188/264 D |

OTHER PUBLICATIONS

Article Entitled "Nusselt Number Behavior on Deep Dimpled Surfaces Within a Channel", N.K. Burgess, M.M. Oliveria, and P.M. Ligrani, Feb. 2003, vol. 125, Journal of Heat Transfer.

Dimple Arrays on Surfaces of Channels, Phil Ligrani, Donald Schultz, Professor of Turbomachinery, University of Oxford, on the Web Dec. 1, 2008.

* cited by examiner ical applica-
MULTI-CHAMBERED, LIQUID-COOLED DISC BRAKE

FIELD OF INVENTION

The present disclosure relates to disc brakes. More particularly, the present disclosure relates to internally, liquid-cooled disc brakes.

BACKGROUND

Brakes incorporating discs may be found in a variety of vehicular and industrial applications. In industrial applications, internally liquid-cooled disc brakes may be used. In one known embodiment, the brake includes a copper plate configured to engage the rotating disc and absorb the requisite energy to meet the braking duty cycle. The copper plate is affixed to a cast iron backing, having a plurality of ribs formed thereon. When the copper plate is affixed to the cast iron backing, the ribs form pathways for water or other coolant. Coolant enters an inlet of the brake, travels through the pathways, and exits an outlet that is disposed approximately 180° degrees from the inlet.

SUMMARY OF THE INVENTION

In one embodiment, a liquid-cooled brake disc includes a substantially circular front face surface configured to brake an adjacent rotating member. The liquid-cooled brake disc further includes a substantially circular back face surface, an outer perimeter wall extending from the front face surface to the back face surface, and at least four inner chambers. The inner chambers include a first inner chamber defining a first cooling liquid pathway from a first cooling liquid inlet disposed in the outer perimeter wall to a first cooling liquid outlet disposed in the outer perimeter wall. The inner chambers also include a second inner chamber defining a second cooling liquid pathway from a second cooling liquid inlet disposed in the outer perimeter wall to a second cooling liquid outlet disposed in the outer perimeter wall. The inner further chambers include a third inner chamber defining a third cooling liquid pathway from a third cooling liquid inlet disposed in the outer perimeter wall to a third cooling liquid outlet disposed in the outer perimeter wall. The inner chambers also include a fourth inner chamber defining a fourth cooling liquid pathway from a fourth cooling liquid inlet disposed in the outer perimeter wall to a fourth cooling liquid outlet disposed in the outer perimeter wall.

In another embodiment, a brake disc includes a front face surface configured to brake an adjacent rotating member. The brake disc further includes a back face surface and at least four inner chambers. The inner chambers include a first inner chamber defining a first liquid pathway from a first cooling liquid inlet to a first liquid outlet. The inner chambers also include a second inner chamber defining a second liquid pathway from a second liquid inlet to a second liquid outlet. The inner chambers further include a third inner chamber defining a third liquid pathway from a third liquid inlet to a third liquid outlet. The inner chambers also include a fourth inner chamber defining a fourth liquid pathway from a fourth liquid inlet to a fourth liquid outlet.

In yet another embodiment, a braking system includes at least one rotating disc, and at least one brake disc having a front face and a rear face. The brake disc has at least four inner chambers disposed therein. Each of the at least four inner chambers has a liquid inlet and a liquid outlet and defines a liquid pathway. At least one biasing element is configured to move the front face of the at least one brake disc into contact with the at least one rotating disc.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
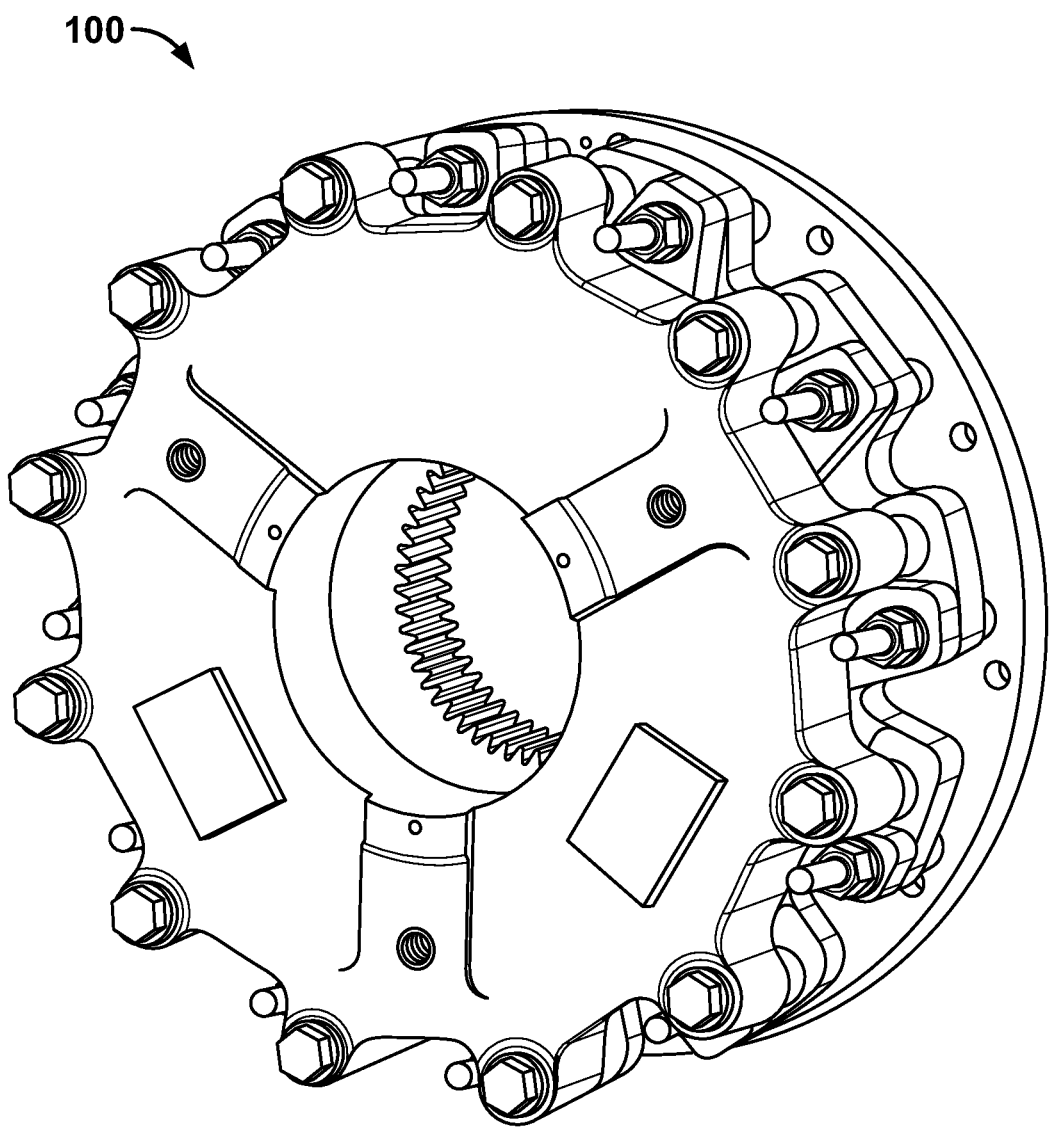
FIG. 1 is a perspective view of one embodiment of a braking system.
Figure 2:
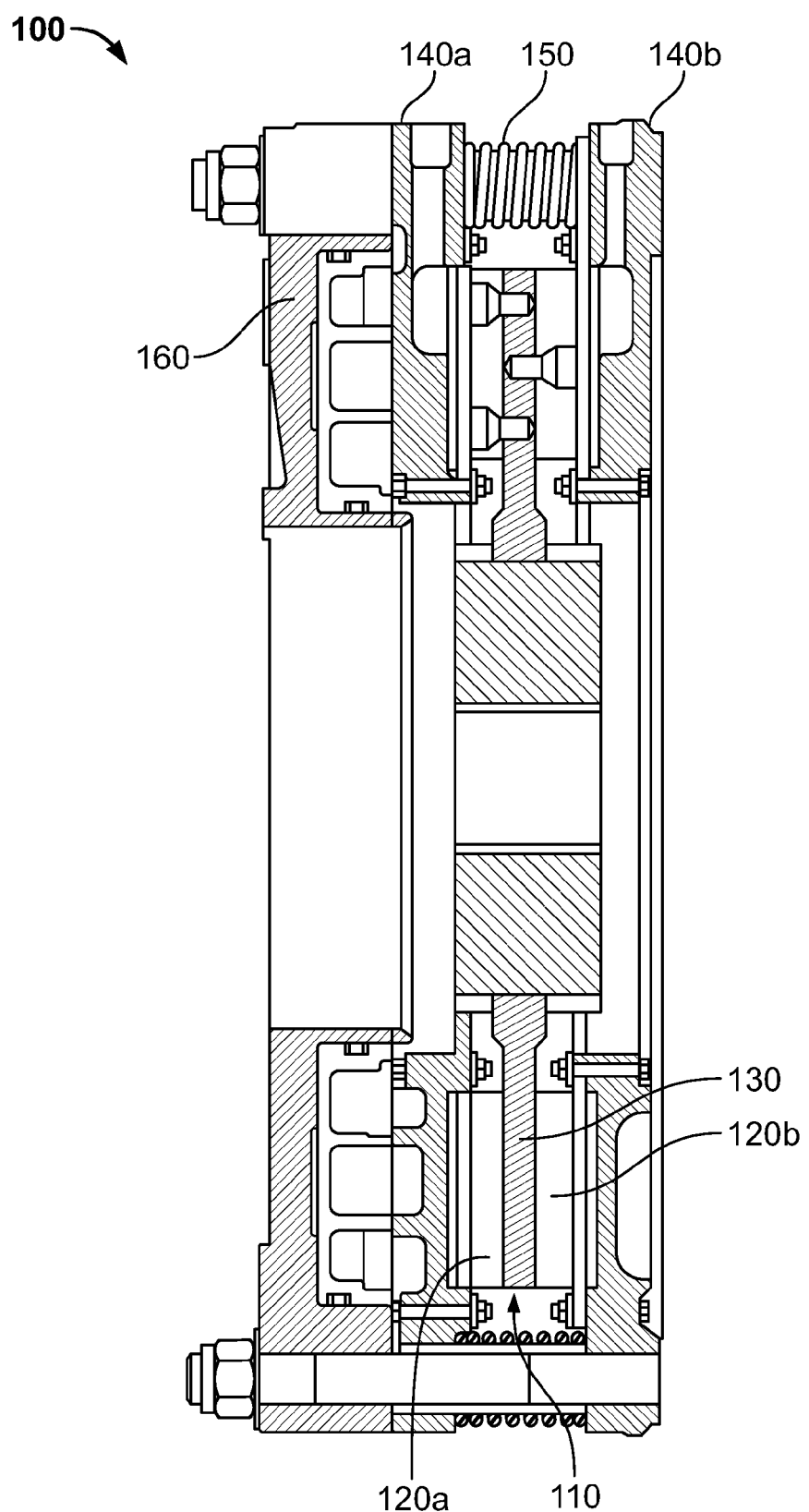
FIG. 2 is a cross-section of the braking system.

FIGS. 1 and 2 illustrate a perspective view and a cross-section, respectively, of one embodiment of a braking system 100. The braking system 100 is a disc type, externally cooled unit configured to absorb and dissipate the thermal loads associated with the clutch and brake applications. The braking system 100 may be used in industrial applications, such as, Draw works application, mooring application (such as in the oil and gas industry), dynamic braking, emergency stop and parking/holding. However, it should be understood that the braking system 100 may be used in any application where braking is required.

The braking system 100 includes a rotating disc sub-assembly 110, which also may be referred to as a friction disc sub-assembly. The rotating disc sub-assembly 110 includes a pair of friction discs 120a,b disposed about a friction disc core 130. In an alternative embodiment (not shown) a single rotating disc is used in place of a rotating disc sub-assembly.

The rotating disc sub-assembly 110 is disposed between a first brake disc 140a and a second brake disc 140b. The brake discs 140a,b may also be referred to as reaction plates. During rotation of the rotating disc sub-assembly, the first brake disc 140a is biased away from the rotating disc sub-assembly 110 and the second brake disc 140b by a first biasing element 150, shown here as a release spring. To brake the rotating disc sub-assembly 110, a second biasing element 160, shown here as a dual piston assembly, biases the first brake disc 140a towards the rotating disc sub-assembly 110. Together, the first brake disc 140a and the rotating disc sub-assembly 110 are biased towards the second brake disc 140b. The rotating disc sub-assembly 110 transfers rotational energy to the first and second brake discs 140a,b, thereby slowing its rotation. As one of ordinary skill in the art would understand, the transfer of rotational energy to the first and second brake discs 140a,b produces heat. Accordingly, in one embodiment, the brake discs 140a,b have a plurality of cooling liquid pathways disposed therein. A cooling liquid, such as water, sea water, ethylene glycol, or any other liquid flows through an inlet into the brake disc and one of the cooling liquid pathways, and absorbs the heat. The cooling liquid then flows through an outlet out of the brake disc, thereby dispersing the heat.

Although the illustrated embodiment shows a brake assembly having one rotating disc sub-assembly and two brake discs, it should be understood that any combination of rotating discs and brake discs may be employed. In one example, the brake assembly includes one rotating disc and one brake disc. In another example, the brake assembly includes two rotating discs and two brake discs. In other examples, the brake assembly include two rotating discs and three or four brake discs.

Figure 3:
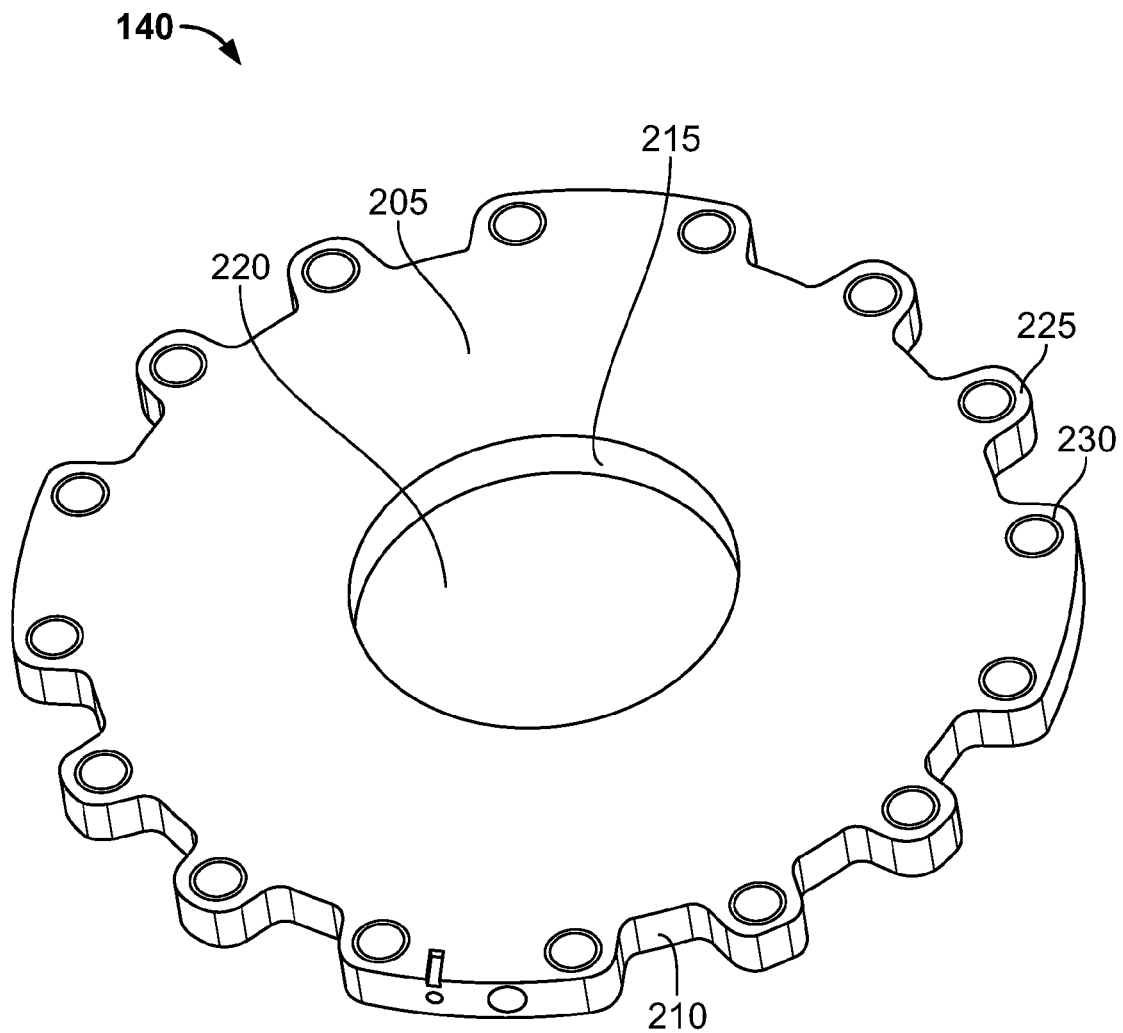
FIG. 3 is a perspective view of one embodiment of a brake disc.

FIG. 3 illustrates a perspective view of one embodiment of a brake disc 140. The brake disc 140 includes a substantially circular front face surface 205 configured to brake an adjacent rotating member. The brake disc 140 further includes a substantially circular back face surface (not shown in this view). An outer perimeter wall 210 extends from the front face surface 205 to the back face surface. Additionally, an inner perimeter wall 215 extends from the front face surface 205 to the back face surface, thereby defining a substantially circular aperture 220 in the brake disc 140. In alternative embodiments (not shown), the aperture may be square, triangular, oval, or any other geometric shape. In another alternative embodiment (not shown), the brake disc does not include an aperture.

In the illustrated embodiment, the brake disc 140 includes a plurality of tabs 225 disposed about the outer perimeter. Each tab 225 has an aperture 230 disposed therein, configured to receive a shaft (not shown). The brake disc 140 may translate along the shafts when it is being biased by one of the first and second biasing elements. In alternative embodiments, the brake disc may not include tabs.

Figure 4:
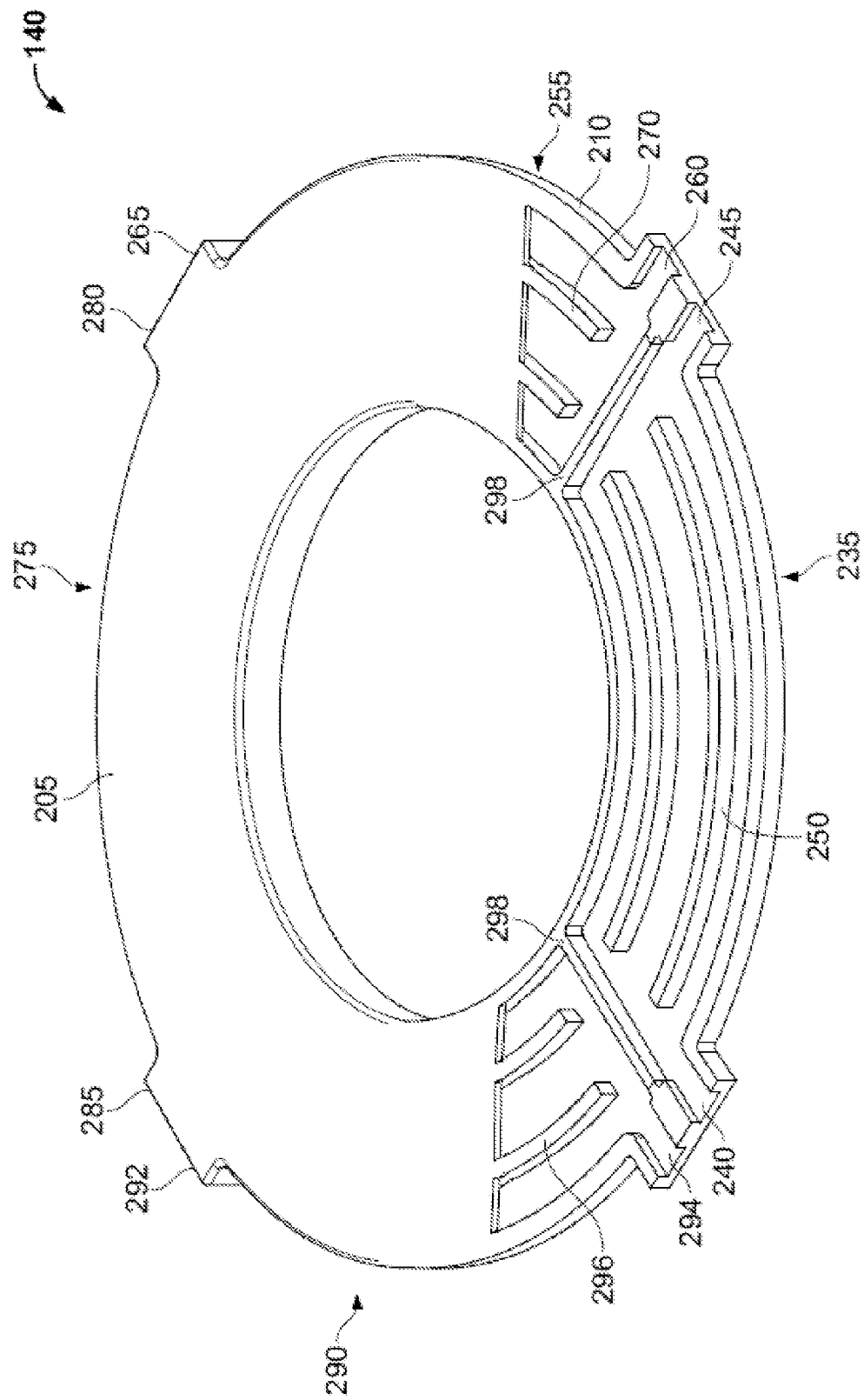
FIG. 4 is a cutaway view of the brake disc.

FIG. 4 is a cutaway view of the brake disc 140. In the illustrated embodiment, a portion of the front face surface 205 is removed to reveal one of the plurality of inner chambers disposed therein. A first inner chamber 235 defines a first cooling liquid pathway from a first cooling liquid inlet 240 disposed in the outer perimeter 210 to a first cooling liquid outlet 245 disposed in the outer perimeter 210. The first inner chamber 235 further includes a plurality of ribs 250 disposed therein. The ribs 250 may direct the flow of the cooling liquid, and also provide additional surface area to facilitate heat transfer between the brake disc 140 and the cooling liquid. It should be understood that the ribs 250 need not have the geometry illustrated in FIG. 4. In an alternative embodiment, the ribs may have any shape. In another alternative embodiment (not shown), the ribs may be omitted. In yet another alternative embodiment, the first inner chamber also includes one or more cooling structures (not shown), disposed thereon. Such cooling structures provide increased surface area to facilitate heat transfer between the brake disc 140 and the cooling liquid.

The brake disc 140 further includes a second inner chamber 255 defining a second cooling liquid pathway from a second cooling liquid inlet 260 disposed in the outer perimeter 210 to a second cooling liquid outlet 265 disposed in the outer perimeter 210. In the cutaway drawing of FIG. 4, the second inner chamber 255 is only partially shown, as the remainder is covered by the front face surface 205. The second inner chamber 255 further includes a plurality of ribs 270 disposed therein. The ribs 270 may direct the flow of the cooling liquid, and also provide additional surface area to facilitate heat transfer between the brake disc 140 and the cooling liquid. It should be understood that the ribs 270 need not have the geometry illustrated in FIG. 4. In an alternative embodiment, the ribs may have any shape. In another alternative embodiment (not shown), the ribs may be omitted. In yet another alternative embodiment, the second inner chamber also includes one or more cooling structures (not shown), disposed thereon. Such cooling structures provide increased surface area to facilitate heat transfer between the brake disc 140 and the cooling liquid.

The brake disc 140 further includes a third inner chamber 275 defining a third cooling liquid pathway from a third cooling liquid inlet 280 disposed in the outer perimeter 210 to a third cooling liquid outlet 285 disposed in the outer perimeter 210. In the partial cutaway drawing of FIG. 4, the third inner chamber 275 is covered by the front face surface 205, and therefore not shown. However, it should be understood that the third inner chamber 275 may have the same structure as the first inner chamber 235. In other words, the third inner chamber 275 further includes a plurality of ribs (not shown) disposed therein. The ribs may direct the flow of the cooling liquid, and also provide additional surface area to facilitate heat transfer between the brake disc 140 and the cooling liquid. The ribs may have any shape. In an alternative embodiment (not shown), the ribs may be omitted. In another alternative embodiment, the third inner chamber 275 also includes one or more cooling structures (not shown), disposed thereon. Such cooling structures provide increased surface area to facilitate heat transfer between the brake disc 140 and the cooling liquid.

The brake disc 140 further includes a fourth inner chamber 290 defining a fourth cooling liquid pathway from a fourth cooling liquid inlet 292 disposed in the outer perimeter 210 to a fourth cooling liquid outlet 294 disposed in the outer perimeter 210. In the cutaway drawing of FIG. 4, the fourth inner chamber 290 is only partially shown, as the remainder is covered by the front face surface 205. The fourth inner chamber 290 further includes a plurality of ribs 296 disposed therein. The ribs 296 may direct the flow of the cooling liquid, and also provide additional surface area to facilitate heat transfer between the brake disc 140 and the cooling liquid. It should be understood that the ribs 296 need not have the geometry illustrated in FIG. 4. In an alternative embodiment, the ribs may have any shape. In another alternative embodiment (not shown), the ribs may be omitted. In yet another alternative embodiment, the fourth inner chamber includes one or more cooling structures (not shown), disposed thereon. Such cooling structures provide increased surface area to facilitate heat transfer between the brake disc and the cooling liquid.

As further illustrated in FIG. 4, each of the inner chambers is separated from adjacent inner chambers by a divider 298. The dividers may direct the flow of the cooling liquid, and also provide additional surface area to facilitate heat transfer between the brake disc 140 and the cooling liquid. In an alternative embodiment (not shown), the dividers may be omitted.

In the illustrated embodiment, the first cooling liquid inlet 240 is separated from the first cooling liquid outlet 245 by an angular distance of 90°. Similarly, the second cooling liquid inlet 260 is separated from the second cooling liquid outlet 265 by an angular distance of 90°, the third cooling liquid inlet 280 is separated from the third cooling liquid outlet 285 by an angular distance of 90°, and the fourth cooling liquid inlet 292 is separated from the fourth cooling liquid outlet 294 by an angular distance of 90°. Accordingly, the first liquid pathway 250 is disposed in a first quadrant of the brake disc 140, the second liquid pathway 255 is disposed in a second quadrant of the brake disc 140, the third liquid pathway 275 is disposed in a third quadrant of the brake disc 140, and the fourth liquid pathway 290 is disposed in a fourth quadrant of the brake disc 140.

Figure 5A:
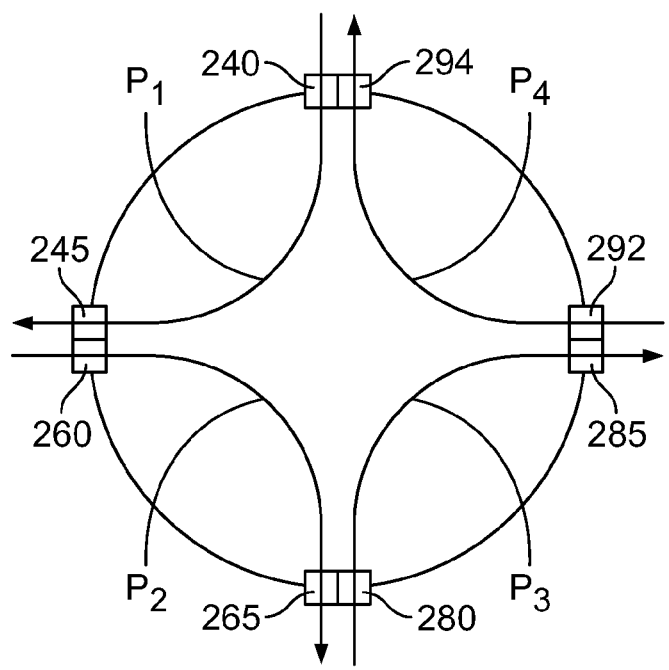
FIG. 5A is a schematic drawing illustrating the liquid pathways of one embodiment of a brake disc.

In the illustrated embodiment, and as further shown schematically in FIG. 5A, the first cooling liquid outlet 245 is adjacent the second cooling liquid inlet 260, the second cooling liquid outlet 265 is adjacent the third cooling liquid inlet 280, the third cooling liquid outlet 285 is adjacent the fourth cooling liquid inlet 292, and the fourth cooling liquid outlet 294 is adjacent the first cooling liquid inlet 240. In such an embodiment, liquid flows along each of the first, second, third, and fourth cooling liquid pathways $P_1, P_2, P_3, P_4$ in substantially the same direction (i.e., in the counterclockwise direction in the view shown in FIG. 5A).

Figure 5B:
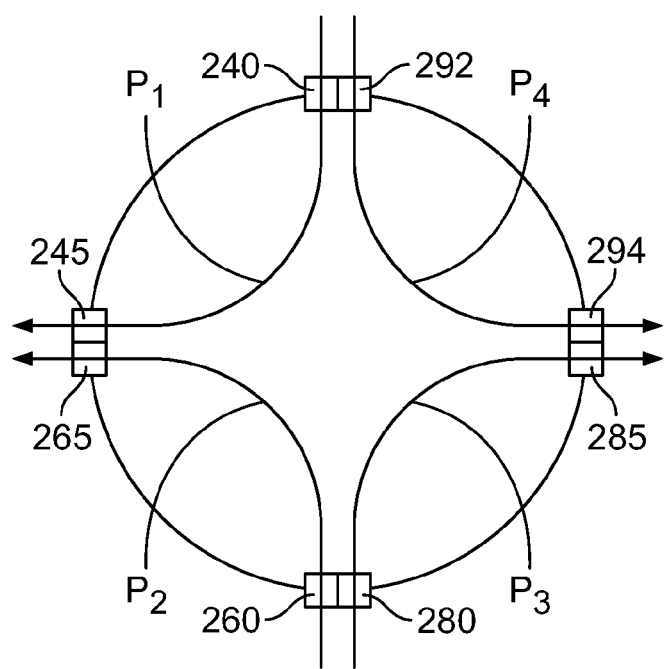
FIG. 5B is a schematic drawing illustrating the liquid pathways of an alternative embodiment of a brake disc.

FIG. 5B is a schematic drawing illustrating cooling liquid pathways $P_1, P_2, P_3, P_4$ in an alternative embodiment. In the illustrated embodiment, the first cooling liquid inlet 240 is adjacent the fourth cooling liquid inlet 292, and the second cooling liquid inlet 260 is adjacent the third cooling liquid inlet 280. Additionally, the first cooling liquid outlet 245 is adjacent the second cooling liquid outlet 265, and the third cooling liquid outlet 285 is adjacent the fourth cooling liquid outlet 294. In such an embodiment, liquid flows in alternating directions along the first, second, third, and fourth cooling liquid pathways $P_1, P_2, P_3, P_4$. In the view shown in FIG. 5B, liquid flows in a counterclockwise direction along the first liquid pathway $P_1$ and the third liquid pathway $P_3$, while liquid flows in a clockwise direction along the second liquid pathway $P_2$ and the fourth liquid pathway $P_4$. In other alternative embodiments (not shown), the direction of flow of each liquid pathway may be determined as desired.

Although the illustrated embodiment depicts a brake plate 140 having four liquid pathways, it should be understood that alternative embodiments may include five or more liquid pathways. In other alternative embodiments, the brake plate may include three liquid pathways or less.

In one embodiment, the brake disc 140 is a unitary structure. In other words, the front face 205, the back face, the outer perimeter wall 210, and the inner perimeter wall 215 are a single, unitary component. The brake disc 140 may be cast, machined, printed, or otherwise formed as a single piece. In an alternative embodiment, the brake disc may be assembled from a plurality of components.

In one embodiment, the brake disc 140 is constructed of an alloy of aluminum and silicon carbide. Such an alloy may be referred to as an aluminum metal matrix composite, or aluminum MMC. One known aluminum MMC is commercially available under the brand name DURALCAN. In one known embodiment, the entire brake disc is constructed of aluminum MMC. In an alternative embodiment, the front face surface of the brake disc is constructed of aluminum MMC. In other alternative embodiments, other metals may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A liquid-cooled brake disc comprising:
   a substantially circular front face surface configured to brake an adjacent rotating member;
   a substantially circular back face surface;
   an outer perimeter wall extending from the front face surface to the back face surface; and
   at least four inner chambers, including:
      a first inner chamber defining a first cooling liquid pathway from a first cooling liquid inlet disposed in the outer perimeter wall to a first cooling liquid outlet disposed in the outer perimeter wall,
      a second inner chamber defining a second cooling liquid pathway from a second cooling liquid inlet disposed in the outer perimeter wall to a second cooling liquid outlet disposed in the outer perimeter wall,
      a third inner chamber defining a third cooling liquid pathway from a third cooling liquid inlet disposed in the outer perimeter wall to a third cooling liquid outlet disposed in the outer perimeter wall, and
      a fourth inner chamber defining a fourth cooling liquid pathway from a fourth cooling liquid inlet disposed in the outer perimeter wall to a fourth cooling liquid outlet disposed in the outer perimeter wall.

2. The liquid-cooled brake disc of claim 1, further comprising an inner perimeter wall extending from the front face surface to the back face surface, thereby defining an aperture in the liquid-cooled brake disc.

3. The liquid-cooled brake disc of claim 2, wherein the aperture is a substantially circular aperture.

4. The liquid-cooled brake disc of claim 1, wherein the first cooling liquid inlet is separated from the first cooling liquid outlet by an angular distance of 90°, the second cooling liquid inlet is separated from the second cooling liquid outlet by an angular distance of 90°, the third cooling liquid inlet is separated from the third cooling liquid outlet by an angular distance of 90°, and the fourth cooling liquid inlet is separated from the fourth cooling liquid outlet by an angular distance of 90°.

5. The liquid-cooled brake disc of claim 1, wherein the first cooling liquid outlet is adjacent the second cooling liquid inlet, the second cooling liquid outlet is adjacent the third cooling liquid inlet, the third cooling liquid outlet is adjacent the fourth cooling liquid inlet, and the fourth cooling liquid outlet is adjacent the first cooling liquid inlet.

6. The liquid-cooled brake disc of claim 1, wherein the first cooling liquid inlet is adjacent the fourth cooling liquid inlet, and the second cooling liquid inlet is adjacent the third cooling liquid inlet.

7. The liquid-cooled brake disc of claim 6, wherein the first cooling liquid outlet is adjacent the second cooling liquid outlet, and the third cooling liquid outlet is adjacent the fourth cooling liquid outlet.

8. The liquid-cooled brake disc claim 1, wherein the front face surface, the back face surface, and the outer perimeter wall are a single, unitary component.

9. The liquid-cooled brake disc claim 1, wherein the liquid-cooled brake disc is constructed of an alloy of aluminum and silicon carbide.

10. A brake disc comprising:
a front face surface configured to brake an adjacent rotating member;
a back face surface;
at least four inner chambers, including:
a first inner chamber defining a first liquid pathway from a first cooling liquid inlet to a first liquid outlet,
a second inner chamber defining a second liquid pathway from a second liquid inlet to a second liquid outlet,
a third inner chamber defining a third liquid pathway from a third liquid inlet to a third liquid outlet, and
a fourth inner chamber defining a fourth liquid pathway from a fourth liquid inlet to a fourth liquid outlet.

11. The brake disc of claim 10, wherein the first liquid pathway is disposed in a first quadrant of the brake disc, the second liquid pathway is disposed in a second quadrant of the brake disc, the third liquid pathway is disposed in a third quadrant of the brake disc, and the fourth liquid pathway is disposed in a fourth quadrant of the brake disc.

12. The brake disc of claim 10, wherein the brake disc is a single component cast from an alloy of aluminum and silicon carbide.

13. The brake disc of claim 10, wherein each of the at least four inner chambers has a plurality of ribs disposed therein.

14. The brake disc of claim 10, wherein each of the at least four inner chambers has a plurality of cooling structures disposed thereon.

15. A braking system comprising:
at least one rotating disc;
at least one brake disc having a front face and a rear face, and at least four inner chambers disposed therein, each of the at least four inner chambers having a liquid inlet and a liquid outlet and defining a liquid pathway;
at least one biasing element configured to move the front face of the at least one brake disc into contact with the at least one rotating disc.

16. The braking system of claim 15, wherein the at least one rotating disc includes a first rotating disc, and the at least one brake disc includes a first brake disc and a second brake disc.

17. The braking system of claim 15, wherein the at least one brake disc is a unitary structure.

18. The braking system of claim 15, wherein the at least four inner chambers of the at least one brake disc include a first inner chamber in a first quadrant of the at least one brake disc, a second inner chamber in a second quadrant of the at least one brake disc, a third inner chamber in a third quadrant of the at least one brake disc, and a fourth inner chamber in a fourth quadrant of the at least one brake disc.

19. The braking system of claim 15, wherein the at least one brake disc further includes an outer perimeter wall extending from the front face to the rear face.

20. The braking system of claim 19, wherein each liquid inlet and liquid outlet of the at least one brake disc is disposed on the outer perimeter wall.

* * * * *